United States Patent
Rice et al.

(10) Patent No.: US 10,038,445 B1
(45) Date of Patent: Jul. 31, 2018

(54) COMPONENT AUTHENTICATION UTILIZING MULTI-LEVEL ARBITER

(71) Applicant: SEMICONDUCTOR COMPONENTS INDUSTRIES, LLC, Phoenix, AZ (US)

(72) Inventors: Jeremy Rice, Moscow, ID (US); Rory Buchanan, Pocatello, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/454,129

(22) Filed: Mar. 9, 2017

Related U.S. Application Data

(60) Provisional application No. 62/445,547, filed on Jan. 12, 2017.

(51) Int. Cl.
*H03K 19/00* (2006.01)
*H03K 19/003* (2006.01)
*H03K 5/133* (2014.01)

(52) U.S. Cl.
CPC .......... *H03K 19/003* (2013.01); *H03K 5/133* (2013.01)

(58) Field of Classification Search
None
See application file for complete search history.

(56) References Cited

U.S. PATENT DOCUMENTS

| | | | |
|---|---|---|---|
| 7,898,283 B1 * | 3/2011 | Koushanfar | G06F 21/72 326/47 |
| 8,260,708 B2 * | 9/2012 | Potkonjak | G06F 21/10 380/231 |
| 8,981,810 B1 * | 3/2015 | Trimberger | H03K 19/003 326/15 |
| 9,046,573 B1 * | 6/2015 | Watt | G06F 17/5045 |
| 9,082,514 B1 * | 7/2015 | Trimberger | G11C 29/06 |
| 9,171,144 B2 * | 10/2015 | Lewis | G06F 21/70 |
| 9,279,850 B1 * | 3/2016 | Pedersen | H03K 19/003 |
| 9,628,272 B2 * | 4/2017 | Rostami | H04L 9/0866 |
| 9,712,330 B2 * | 7/2017 | Smith | H04L 9/3278 |

(Continued)

OTHER PUBLICATIONS

Amol Bandal et al., "RFID Security Using Lightweight Mutual Authentication and Ownership Transfer Protocol," International Journal of Ad hoc, Sensor & Ubiquitous Computing (IJASUC) Vo. 3, No. 3, Jun. 2012, 11 pages.

(Continued)

*Primary Examiner* — Crystal L Hammond
(74) *Attorney, Agent, or Firm* — Atesa Legal PLLC

(57) ABSTRACT

A method for component authentication includes delaying an input signal along a first propagation path and a second propagation path, each propagation path including a same number of delay stages. A plurality of control inputs alters the first propagation path to include at least one delay stage from the second propagation path, and alters the second propagation path to include at least one delay stage from the first propagation path. A time difference between a first output of the first propagation path and a second output of the second propagation path is quantized into a plurality of time bins represented by a multi-bit output. The multi-bit output is transformed with a non-linear transform to provide a response output.

20 Claims, 12 Drawing Sheets

(56) References Cited

U.S. PATENT DOCUMENTS

| | | | | |
|---|---|---|---|---|
| 2011/0239002 A1* | 9/2011 | Beckmann | ............. | G06F 9/455 713/189 |
| 2012/0081143 A1* | 4/2012 | Behrends | ................ | G06F 7/588 326/8 |
| 2013/0129083 A1* | 5/2013 | Fujino | ..................... | G11C 7/24 380/29 |
| 2013/0202107 A1* | 8/2013 | Danger | ............ | G01R 31/31719 380/44 |
| 2015/0195088 A1* | 7/2015 | Rostami | ................... | G09C 1/00 380/28 |

OTHER PUBLICATIONS

Charles Herder et al., "Physical Unclonable Functions and Applications: A Tutorial," Proceedings of the IEEE, vol. 102, No. 8, Aug. 2014, pp. 1126-1141; 16 pages.

G. Edward Suh et al., "Physical Unclonable Functions for Device Authentication and Secret Key Generation," DAC 2007, Jun. 4-8, 2007; 6 pages.

Mehrdad Majzoobi et al., "Lightweight Secure PUFs," Computer-Aided Design, 1008, ICCAD 2008, IEEE/ACM Conference on Nov. 10-13, 2008, pp. 670-673; 4 pages.

Stefan Katzenbeisser et al., "PUFs: Myth, Fact or Busted? A Security Evaluation of Physically Unclonable Functions (PUFs) Cast in Silicon," Springer Berlin/Heidelberg, 2012, Cryptographic Hardware and Embedded Systems (CHES), vol. 7428, pp. 283-301; 18 pages.

Takanori Machida et al., "A New Arbiter PUF for Enhancing Unpredictability on FPGA," Hindawi Publishing Corporation, The Scientific World Journal, vol. 2015, Article ID 864812; 14 pages.

Ulrich Ruhrmair et al., "Modeling Attacks on Physical Unclonable Functions," Chicago: Association for Computing Machinery, 2010, ACM Conference on Computer and Communications Security; 11 pages.

* cited by examiner

COMPONENT AUTHENTICATION UTILIZING MULTI-LEVEL ARBITER

CROSS-REFERENCE TO RELATED APPLICATIONS

This application is a utility application claiming priority to U.S. Provisional Application Ser. No. 62/445,547 filed on Jan. 12, 2017 entitled "COMPONENT AUTHENTICATION UTILIZING MULTI-LEVEL ARBITER," the entirety of which is incorporated by reference herein.

FIELD

This disclosure relates generally to component authentication, and more specifically to authenticating components while improving resistance to machine learning attacks and reducing instability due to environmental variations.

BACKGROUND

Counterfeiting of integrated circuits (ICs) is an increasing problem that can impact the safety and security of many systems. One solution to the issue of counterfeiting is to use a Physically Unclonable Function (PUF) to authenticate the manufacturing origin of an IC. Arbiter based PUFs are a unique type of PUF. However, arbiter based PUFs are susceptible to temperature and supply variation as well as machine learning attacks.

A silicon based PUF effectively provides a fingerprint for each individual die created, based on tiny manufacturing variations that not even the original manufacturer can duplicate. This fingerprint can be used as a replacement for non-volatile memory (NVM) to perform die-level traceability (DLT) in manufacturing, to improve process yields, and for defect tracking. The PUF can be used as a method for insuring supply chain integrity by allowing end of line manufacturers to query the fingerprint, (e.g., by issuing a "challenge" input), and check the "response" against a secure database stored at the silicon manufacturer's site. A set of Challenge-Response-Pairs (CRPs) are stored in the secure database to uniquely identify each component.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for component authentication, (e.g., for an IC or a module), using a multi-level arbiter to improve resilience to machine learning (ML) attacks while improving PUF stability with respect to environmental variations, including temperature, voltage and noise.

ML attacks are based on modeling PUF behavior to clone, and add, a companion IC to the modeled component thus creating a counterfeited component that responds to the challenge-response-pair (CRP) in the same way as an authentic component. Alternatively, the modeled PUF behavior is included in the counterfeited monolithic device (e.g. in a software algorithm or programmable circuit). Hence, a counterfeit solution is provided to the supply chain. Previous methods to counter ML attacks exacerbate PUF stability. PUF stability means the ability of the PUF to provide the same response for a given challenge over all environmental conditions, (e.g., including one or more of temperature and voltage), and to be stable in the presence of noise. In various embodiments, the silicon based PUFs are based on the delay of a logic element. These delays do not always scale linearly or symmetrically with temperature and/or voltage and as such suffer from bit errors due to these environmental shifts, when embodied with prior solutions. Similar to a Bit Error Rate (BER) in communications systems, a Response Error Rate (RER) is defined for PUF circuits as being the probability that a CRP will vary due to noise, temperature, voltage and circuit ageing effects. The terms BER and RER are used interchangeably herein.

The embodiments of this disclosure resolve issues with ML attacks and stability while providing an effective mechanism for die level or component level traceability. In various embodiments, traceability includes identification of a fabrication location, a lot number, a wafer number, a die location on a wafer, manufacturing date, test date, and test program versions for example. Traceability is important for reducing counterfeit components from entering the supply chain to prevent revenue loss in addition to preventing harm due to failure of a counterfeit component in higher risk medical, industrial or military applications. Component traceability is also helpful for diagnosing returned materials (e.g. Return Material Authorization, or RMA), and for on-going yield enhancement. In an embodiment, the PUF utilizing a multi-level arbiter is used for the creation of private keys for cryptography. In contrast to prior methods that store keys in an NVM, using the authentication methods described herein, the keys are not susceptible to tampering and reverse engineering attacks, which can compromise a network.

Figure 1:
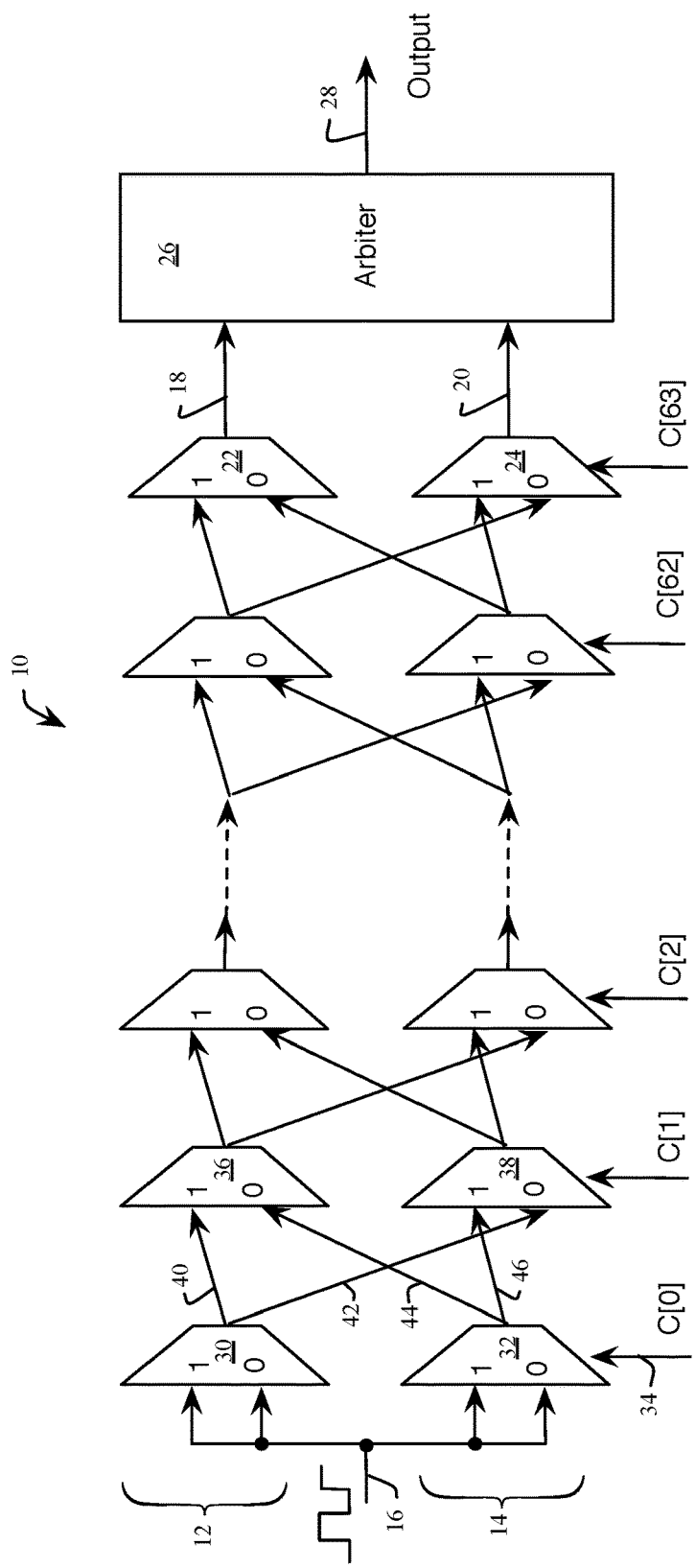
FIG. 1 is a schematic view of an embodiment of a delay based PUF.

Referring to FIG. 1, an embodiment 10 of an arbiter based PUF provides unique information on each die (e.g. IC) based on sending a pulse through two identically designed paths (e.g., delay chains) to determine which path is the fastest. By constructing the delay out of a series of multiplexers, (e.g., "mux's"), with control bits used to determine whether the two pulses cross from one path to the other, or continue on the same path, a CRP is created. Each delay chain is geometrically matched to have the same nominal delay under ideal manufacturing conditions. However, each chain, and each multiplexer within each a chain, will have delay differences due to manufacturing variances. For example, a doping density variations, or mask offsets will introduce minor variations in transistor gain and loading. Although the manufacturing variations would otherwise be considered minor, the matched delay chains for a timing race circuit whose output will depend upon these variations. Different combinations of variations are introduced with the control inputs transposing a pair of multiplexers for the respective delay stage.

Specifically, the embodiment 10 includes a first delay chain 12 and a second delay chain 14. An input signal 16, having a high slew rate rising or falling edge, is applied to both the first delay chain 12 and the second delay chain 14. In one embodiment, the input signal is a square wave, however other signals having at least one edge are envisioned within the scope and spirit of this disclosure. The input signal 16 propagates through the first delay chain 12 to provide a first output 18. The input signal 16 also propagates through the second delay chain 14 to provide a second output 20. The first output 18 and the second output 20 are compared with an arbiter 26 to determine which of the two delay chains 12 and 14 is fastest. The arbiter 26 provides a response output 28 to indicate which of the delay chains 18 and 20 arrived first at the arbiter 26. Although the two delay chains 12 and 14 are designed to be geometrically matched, (and thus creating a timing race circuit), manufacturing variances between various components will affect the two delay chains differently.

In the embodiment 10, inputs to a multiplexer 30 in the first delay chain 12 and a multiplexer 32 in the second delay chain 14 are controlled by a control input 34. The output from the multiplexer 30 connects to a subsequent multiplexer 36 in the first chain 12 over a path 40. The output from the multiplexer 30 connects to a subsequent multiplexer 38 in the second chain 14 over a path 42. Similarly, the output from the multiplexer 32 connects to the subsequent multiplexer 36 in the first chain 12 over a path 44, and the output from the multiplexer 32 connects to the subsequent multiplexer 38 in the second chain 14 over a path 46.

The cross-over arrangement of the embodiment 10 of a PUF is repeated for each pair of multiplexers controlled by a respective control input, to transpose a multiplexer from the first delay chain 12 with a multiplexer from the second delay chain 14. Accordingly, the same nominal delay from the input signal 16 to either the first output 18 or the second output 20 is provided but with manufacturing variations dependent on the control input selections.

A single delay chain PUF implemented, as shown in FIG. 1, can easily be modeled with machine learning algorithms and access to a sufficient number of challenge response pairs, making it possible to create a model, which will accurately predict the response for any given challenge. It has been shown this can be completed in less than one second for delay chain lengths of 64, and the machine learning time scales linearly with the number of stages. To improve upon this susceptibility, other embodiments have used multiple delay chains in parallel, with the outputs combined with an Exclusive OR function (e.g., XOR'ing) to create the response output. This adds a non-linear function into the system, which causes an exponential increase, based on number of parallel chains, in the time required to model a system. However, XOR'ing several parallel chain outputs reduces the stability of the output, which decreases linearly with each additional parallel delay chain. For example, if a single chain has a 5% probability, or RER, of having a bit flip due to temperature and voltage shift, or noise, then adding eight chains in parallel will result in a 40%, (e.g., 8*5%), chance of having a bit flip, making the system all but unusable.

Figure 2:
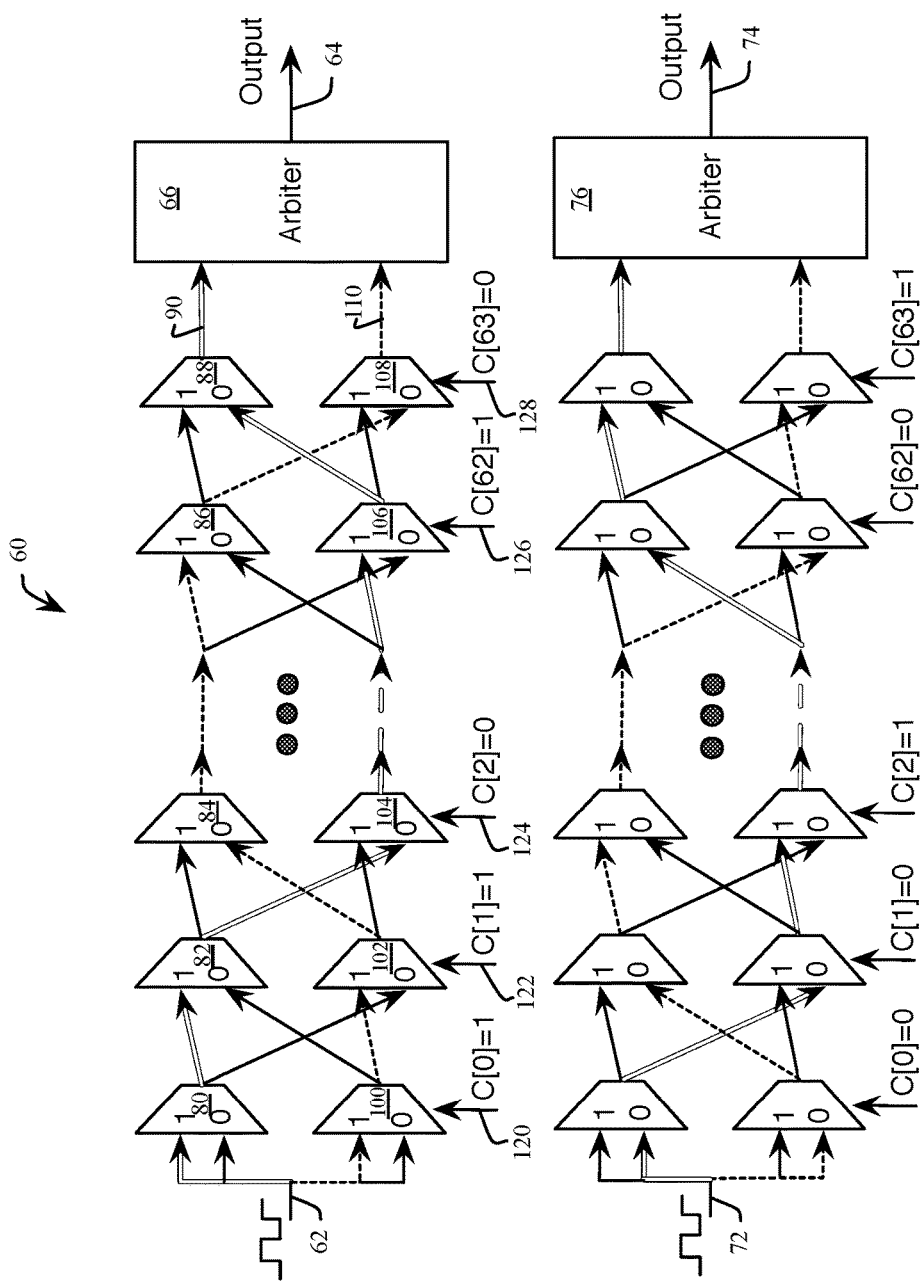
FIG. 2 is a schematic view of an embodiment of a pair of PUFs controlled to have different delay paths.

FIG. 2 shows an embodiment 60 with a pair of PUFs, (e.g., each with two delay chains). Each delay chain is presented with a different challenge input (e.g., control input), thereby altering the delay path through the respective multiplexers. Increasing one or both of the length of each delay chain (e.g., number of stages or pair of multiplexers) and the number of parallel chains, increases the resistance to a machine learning attack. In FIG. 2 an input signal 62 is delayed through a first PUF to provide a response output 64 from an arbiter 66. Similarly, an input signal 72 is delayed through a second PUF to provide a response output 74 from an arbiter 76. The first PUF includes two geometrically matched delay chains, the first chain including multiplexers 80, 82, 84, 86 and 88 with an output 90 connected to the arbiter 66. The second chain includes multiplexers 100, 102, 104, 106 and 108, with an output 110 connected to the arbiter 66.

A pair of propagation paths through the first PUF, (having input signal 62), is described as follows. A first propagation path of the input signal 62 is selected from the "1" input of the multiplexer 80, the "1" input of the multiplexer 82, the "0" input of multiplexer 104, the "1" input of the multiplexer 106 and the "0" input of the multiplexer 88, in accordance with the control input values 1, 1, 0, 1 and 0 corresponding to control inputs 120, 122, 124, 126 and 128. Similarly, a second propagation path of the input signal 62 is selected from the "1" input of the multiplexer 100, the "1" input of the multiplexer 102, the "0" input of multiplexer 84, the "1" input of the multiplexer 86 and the "0" input of the multiplexer 108, in accordance with the control input values 1, 1, 0, 1 and 0 corresponding to control inputs 120, 122, 124, 126 and 128.

Figure 3:
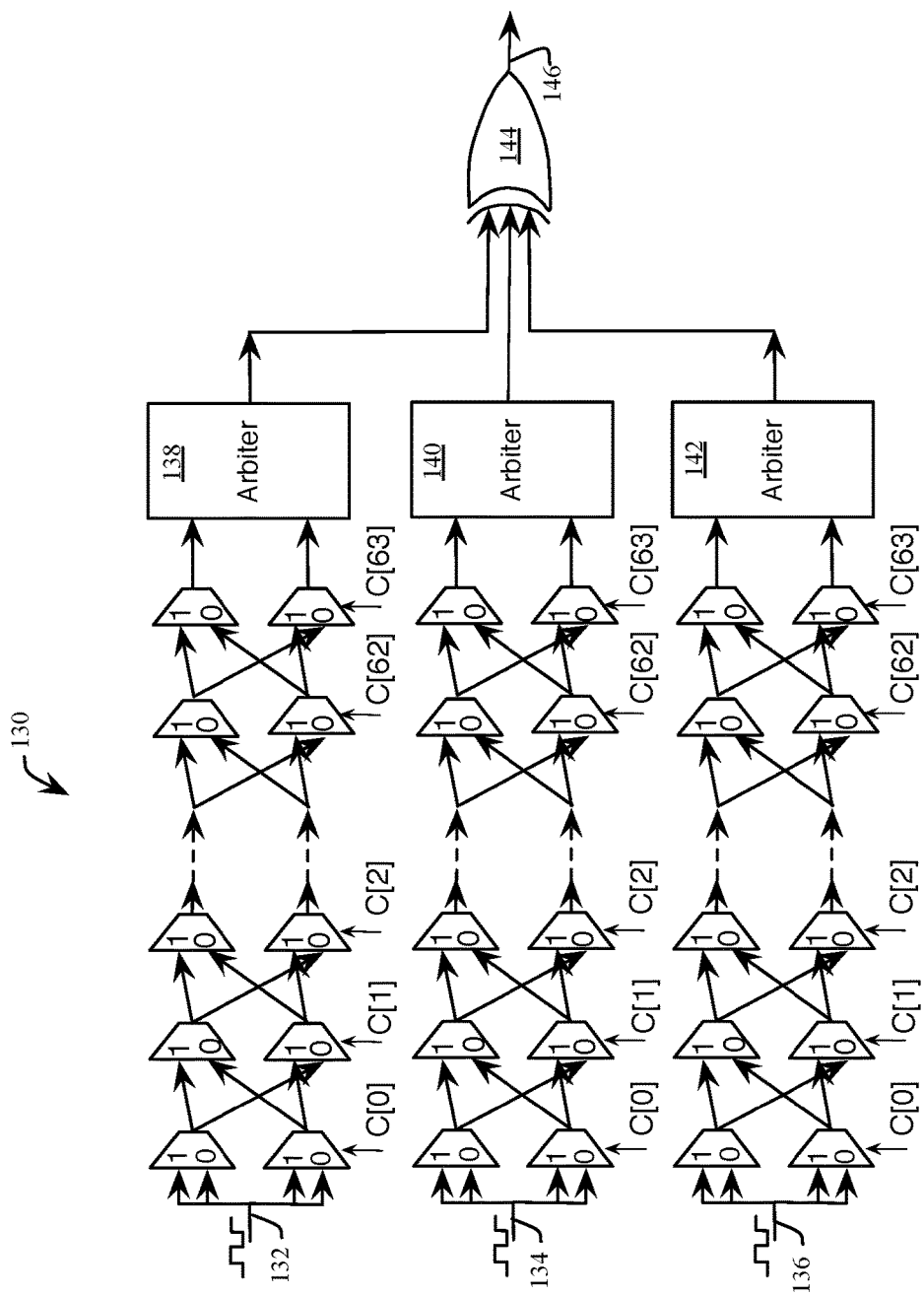
FIG. 3 is a schematic view of an embodiment wherein multiple PUFs are combined with an exclusive OR (XOR) function.

FIG. 3 shows an embodiment 130 having three PUFs, each with two delay chains that are combined with XOR, to increase the nonlinearity of this component authentication system. Specifically, input signals 132, 134 and 136 are delayed through respective PUFs and arbitrated with respective arbiters 138, 140 and 142. In various embodiments, the input signals 132, 134 and 136 are the same stimulus signal. The outputs of the arbiters 138, 140 and 142 are combined with an XOR 144 to provide a response output 146. While the increase in non-linearity of embodiment 130 improves the system's resistance to a machine learning attack, it also increases the system's instability with respect to environmental changes, (e.g., voltage, temperature, and noise).

Figure 4:
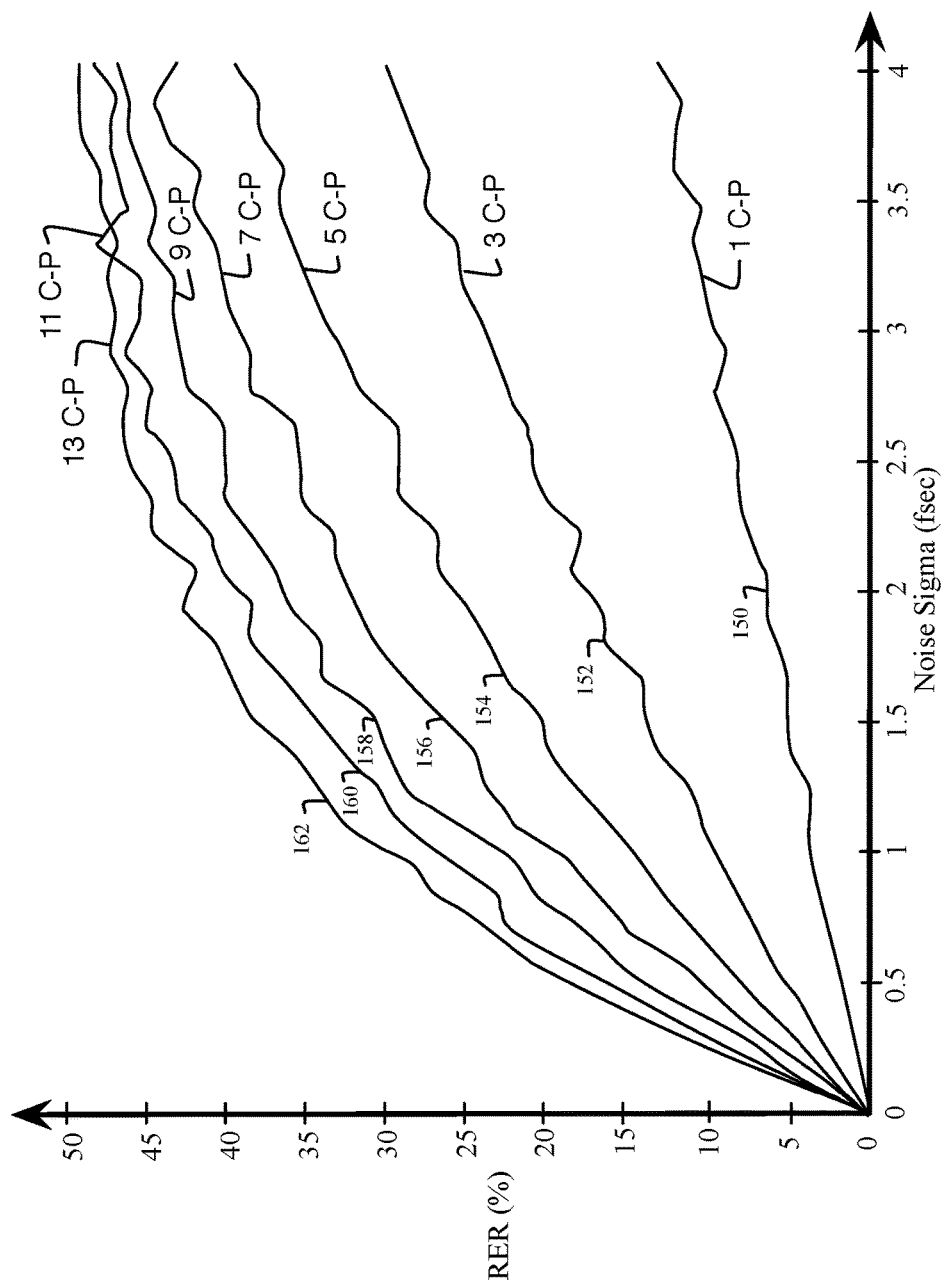
FIG. 4 is a graphical view of a Response Error Rate (RER) simulation for the embodiment of FIG. 3.

Referring to FIG. 4, the instability of an XOR based system, similar to FIG. 3, is further illustrated by looking at the RER of a single delay chain with 64 multiplexers and an arbiter output. Specifically, FIG. 4 shows the RER versus Noise at the input of the arbiter for seven different systems, 150, 152, 154, 156, 158, 160 and 162 corresponding to 1 chain-pair (C-P), 3 C-P, 5 C-P, 7 C-P, 9 C-P, 11 C-P and 13 C-P, wherein each C-P connects with a respective arbiter.

Each of the 64 stages will have a standard deviation for the amount of delay difference between the straight though path and the cross-over path (e.g., crossing between the first delay chain and the second delay chain), δstage. Adding 64 of these delay differences in series will result in δchain=8*δstage, which equals the probability density function (PDF) for a Normal (or Gaussian) distribution assuming that stage is normally distributed and has 0 mean. The output of the Gaussian distributed PDF has a zero mean. Depending on the applied challenge phrase, the cumulative relative delay between the two delay chains will be either positive or negative, resulting in an equal probability of the response output being a 1 or a 0. Most of the outputs will be close to the zero mean of this Gaussian distributed PDF. The further the output response is from the mean value of the PDF, the less susceptible the response will be to changes due to noise temperature or voltage variation, and thus more stable.

Figure 5:
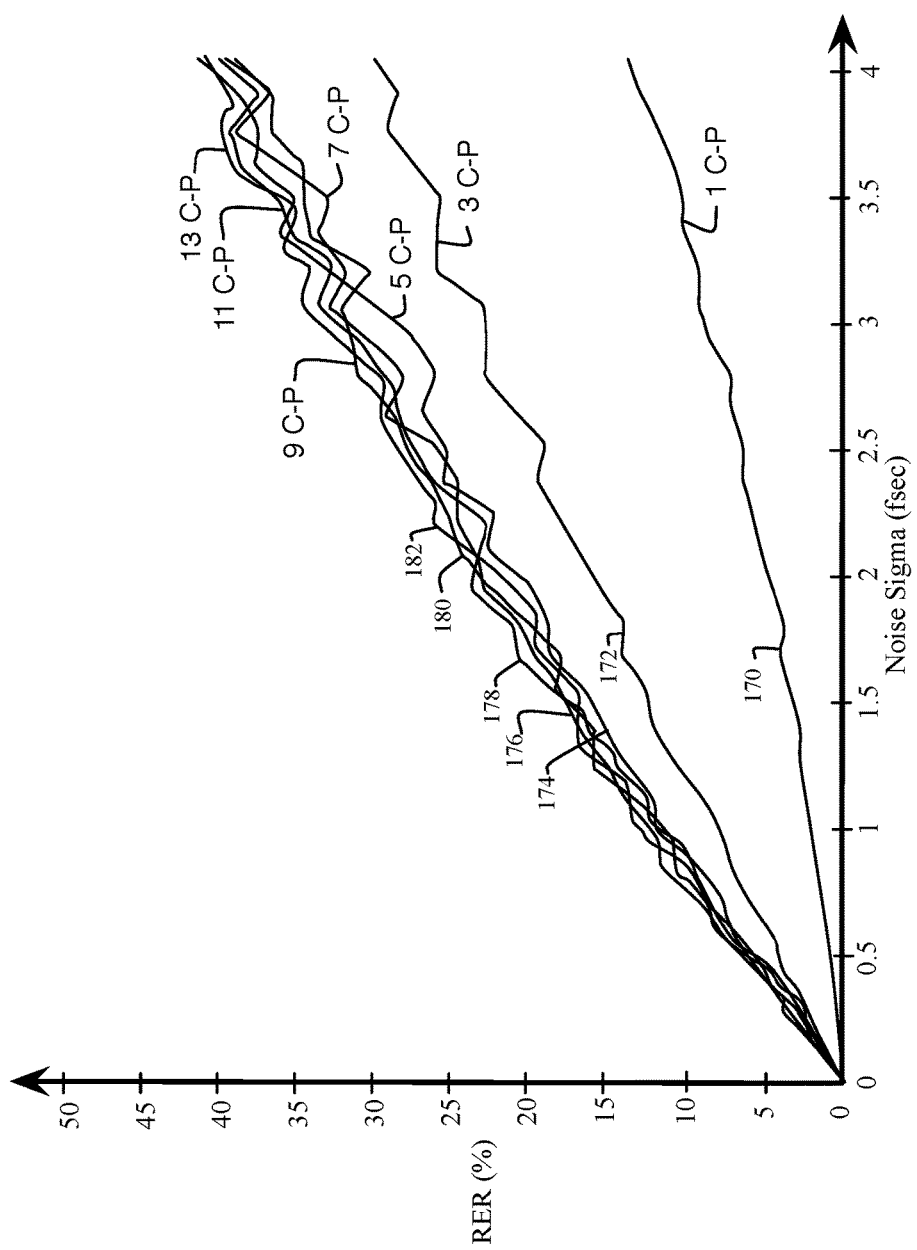
FIG. 5 is a graphical view of a RER simulation of a PUF-based system with a multi-bit arbiter, in accordance with an embodiment of the present disclosure.

FIG. 5 shows an improvement in RER using a multi-level arbiter combined with a Signed MAX non-linear function (or operator) to determine the difference in delay between two delay chains, rather than relying on a binary decision for delay path arbitration as used in FIG. 4. Specifically, FIG. 5 shows the RER versus Noise at the input of the arbiter for seven different systems, 170, 172, 174, 176, 178, 180 and 182 corresponding to 1 chain-pair (C-P), 3 C-P, 5 C-P, 7 C-P, 9 C-P, 11 C-P and 13 C-P, wherein each C-P is connected to a respective multi-bit arbiter. As shown in FIG. 5, the number of chains can be increased without increasing the RER, (particularly at 5 or more chains), because the system is less dependent on variations to the temperature and supply voltage. Increasing the number of chains causes the PUF to have higher immunity to machine learning attacks.

Figure 6:
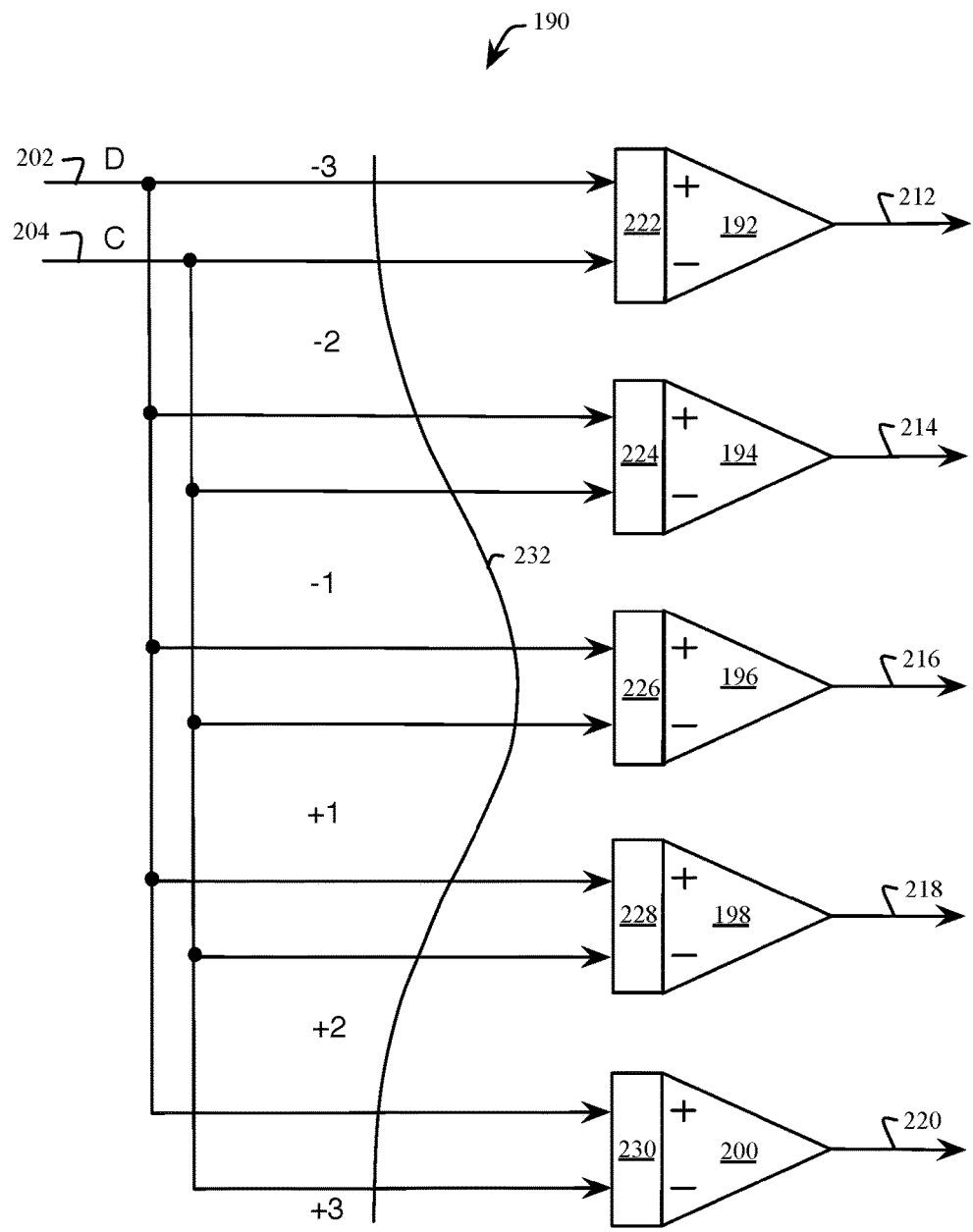
FIG. 6 is a schematic view of a multi-bit arbiter, in accordance with an embodiment of the present disclosure.

Referring to FIG. 6, an embodiment 190 of a multi-bit arbiter is shown. Embodiments of the multi-level arbiter described herein, determine a qualitative difference in delay between the respective two delay chains rather than merely determining which delay chain is faster. Using this qualitative information, additional non-linear functions can be used to combine the data from several parallel arbiter PUFs, which not only make it virtually impossible to clone, but also improves upon the stability of the PUF response; rather than weaken it as prior methods do. The arbiter of FIG. 6 bins the output according to the signed magnitude, of the time difference between the two delay paths. The embodiment 190 of an arbiter includes five comparators 192, 194, 196, 198 and 200, each configured to compare a pair of delay chain outputs 202 and 204, and provide respective outputs 212, 214, 216, 218 and 220 to a non-linear function. In other embodiments, the number of comparators is different than five as a design choice between area consumption circuit complexity and the resolution to which the Gaussian PDF is converted to a uniform PDF. The number of comparators need not be five, rather any number of comparators being more than one is comprehended within the scope and spirit of this disclosure. Additionally, increasing the number of comparators increases the machine learning complexity.

Each of the comparators 192, 194, 196, 198 and 200 further includes a respective input delay 222, 224, 226, 228 and 230, configured to convert the Gaussian distributed PDF 232 to a uniform PDF. In one embodiment, each of the input delays is configured to delay the positive input to the respective comparator. In another embodiment, each of the input delays is configured to delay the negative input to the respective comparator. In another embodiment, there is no input delay 222, 224, 226, 228 and 230 (or each of the delays are zero), such that the output of the comparators retains the Gaussian distribution, with a slight reduction in stability due to environmental factors. The input delays for the comparators are chosen such that the probability density function of the signed magnitude output is uniform in the current embodiment, but other target PDFs are also feasible. In one example, simulating and modeling the distribution of the delay chain outputs determines the input delays.

As shown in FIG. 6, the outputs from the five comparators define six time bins (shown as −3, −2, −1, +1, +2 and +3). When only output 220 is active, the "maximum value" time bin +3 is represented. When only output 212 is active, the "minimum value" time bin −3 is represented. In one embodiment, the comparator input delays are designed so that two comparator outputs are active at the same time to define time bins −2, −2, +1 or +2.

A non-linear function is used to combine the outputs of each of the arbiters having a multi-bit signed magnitude output. In various embodiments, the non-linear function is a "Signed MAX function," which takes the maximum (MAX) delay of each of the arbiters. By combining a number of outputs of arbiters with the MAX operator, it will be shown that the stability of the PUF is increased while the immunity against ML attacks is also greatly increased.

The table below shows the expected output of the combiner for a few example arbiter output values assuming three parallel arbiters and five comparators within each arbiter:

| Arbiter #1 Output | Arbiter #2 Output | Arbiter #3 Output | LSB of Challenge Phrase | Combiner Output | Explanation |
| --- | --- | --- | --- | --- | --- |
| −3 | −2 | −1 | X | −3 | \|−3\| > \|−2\| > \|−1\| → −3 is the output |
| +3 | −2 | +2 | X | +3 | \|+3\| > \|−2\| = \|+2\| → +3 is the output |
| +2 | −1 | 1 | X | +2 | \|+2\| > \|−1\| = \|+1\| → +2 is the output |
| −3 | 3 | X | 0 | +3 | \|−3\| = \|+3\| Since LSB of challenge phrase is 0, we chose +3 |
| 3 | X | −3 | 1 | −3 | \|−3\| = \|+3\| Since LSB of challenge phrase is 1, we chose −3 |

Figure 7:
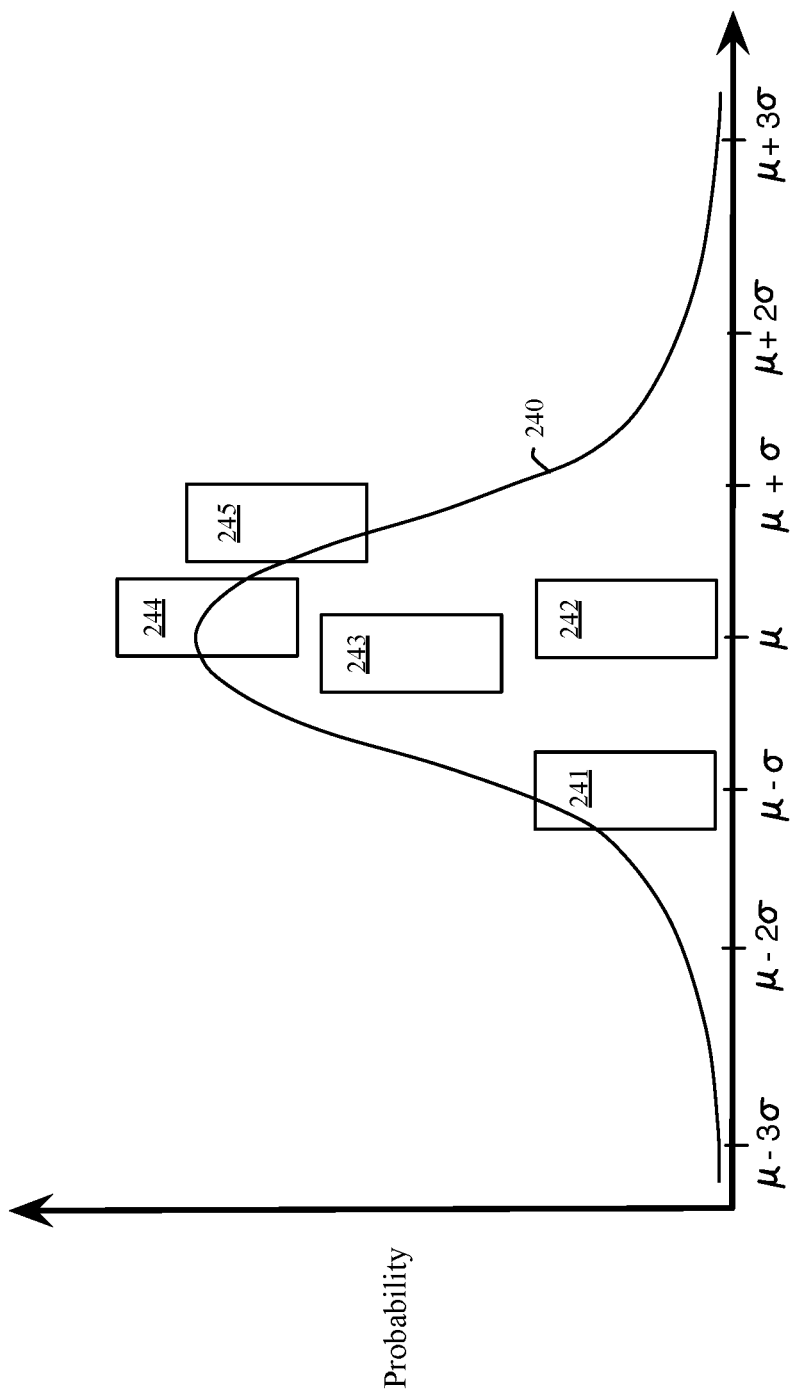
FIG. 7 is a graphical view of a PDF with outputs from five PUFs combined with an XOR function.

FIG. 7 shows the Gaussian distributed PDF 240 input to the arbiters coupled with the XOR combiner of FIG. 3. Boxes 241, 242, 243, 244 and 245 represent five different outputs from five delay chain pairs, with the range of possible delays modified by environmental conditions (e.g., temperature and voltage), and noise. In particular, the output represented by the box 242 in this over-simplification straddles the arbiter binary decision point and will thus not be stable over different conditions. For the case shown, roughly 30% of the time the output 242 will output a logic "0" state, while the other 70% of the time it will be a logic "1" state. When XOR'ing two outputs, the result will be the same, 30% of the time the output will be a logic '0', while 70% of the time the output will be a logic '1'. When additional arbiters with respective delay chain pairs are added (e.g. boxes 241, 243, 244, and 245), the probability that the output will change states with environmental or noise conditions will be the linear sum of all the probabilities that a bit flip can occur. For the normal distribution shown in FIG. 7, the output of the XOR combiner quickly becomes unstable and impractical to use, in contrast to the disclosed embodiments using the multi-bit arbiter combined with a non-linear function for combining the arbiter outputs.

Figure 8:
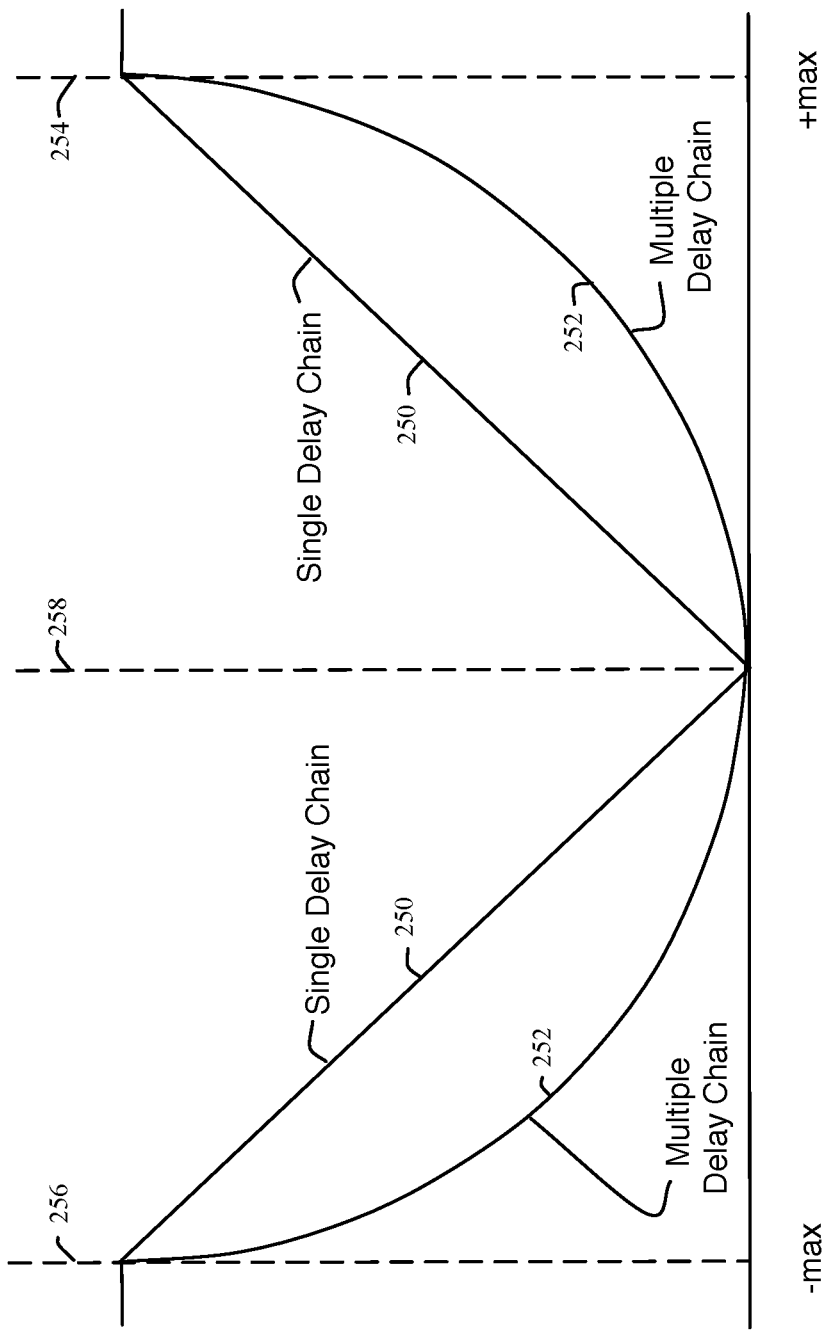
FIG. 8 is a graphical view of a Signed Max PDF for a single PUF chain compared to the PDF for a multiple chain PUF.

In contrast to FIG. 7, the graph of FIG. 8 shows a PDF where the probability of multi-bit arbiter outputs combined with the Signed MAX operator significantly improves stability with respect to environmental conditions and noise. The Signed MAX operator output is the resulting probability that the value of one arbiter output is greater than the value of another arbiter output and can be shown to be the cumulative density function of its inputs raised to the $n^{th}$ power where n is the number of identically and independent inputs to the Signed MAX operator. The cumulative density function is expressed as follows:

$$F_Y(y) = [F_X(y)]^n$$

For example, with reference to FIG. 8 and FIG. 6, the probability of an arbiter output of +3 being greater than +2 or +1 is greater than the same probability with an arbiter output of +1. FIG. 8 shows the PDF 250 for a single delay chain PUF (e.g., the V-shaped linear curve), and the PDF 252 for a multiple delay chain PUF (e.g., the exponential curve). Accordingly, there is a low probability that the arbiter output value will be close to the mean 258 and a greater probability that the arbiter output value will be closer to the maximum 254 or the minimum 256, resulting in a stable PUF over temperature, voltage and noise. As shown in the table above, with the Signed MAX operator, the absolute value of the arbiter outputs are compared and when there are two or more absolute value maximum values, the Least Significant Bit (LSB) of the control input is used to determine the sign of the maximum value. In another embodiment, a control input other than the LSB control input is used to determine the sign of the maximum value.

Figure 9:
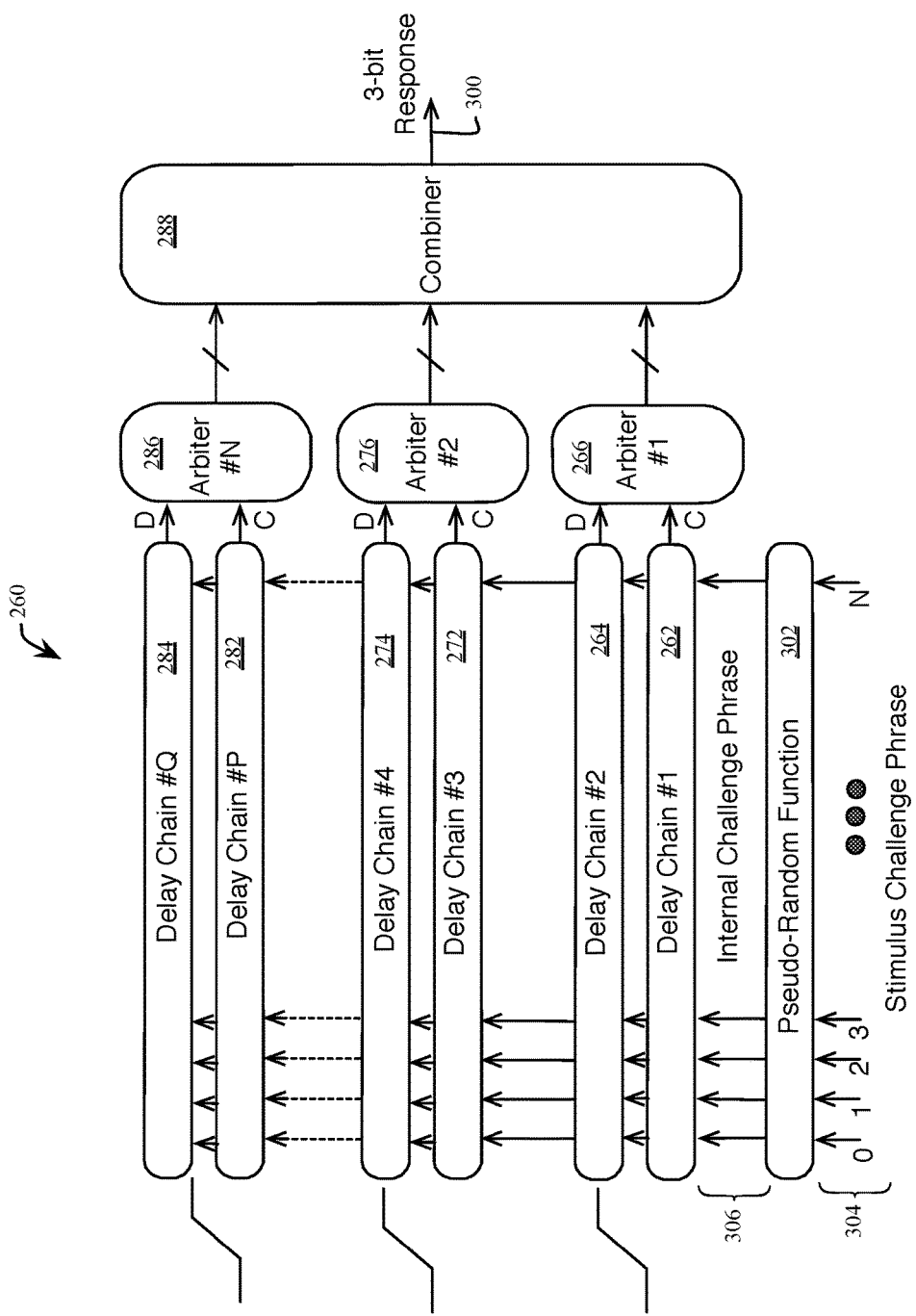
FIG. 9 is a schematic view of multi-level arbiter based PUF system, in accordance with an embodiment of the present disclosure.

FIG. 9 shows an embodiment 260 of a multi-level arbiter based PUF system, having three delay chain pairs. Specifically, delay chains 262 and 264 form a timing race circuit arbitrated with arbiter 266, delay chains 272 and 274 form a timing race circuit arbitrated with arbiter 276, and delay chains 282 and 284 form a timing race circuit arbitrated with arbiter 286. In various embodiments, the arbiters 266, 276 and 286 are implemented as shown in FIG. 6. The arbiters 266, 276 and 286 are combined with Combiner 288 to provide a response output 300 being a Signed MAX transformation of the output of the three arbiters. In some embodiments, the response output is a 3-bit value to represent the five time bins of FIG. 6.

In other embodiments, the Combiner 288 includes a non-linear transfer function different than the Signed MAX function, wherein the probability of the arbiter outputs is shifted away from the mean value of the uniform PDF distribution of the arbiter outputs, while increasing the complexity of ML attacks on the three PUFs. In various embodiments, at least one of the Arbiters 266, 276, and 286 and the Combiner 288 are implemented with differential circuits configured to resist Differential Power Analysis (DPA) or Simple Power Analysis (SPA) reverse engineering techniques that rely on state dependent power radiation.

The embodiment 260 further includes a pseudo-random function generator 302 to randomize the stimulus challenge phrase 304 to provide the internal challenge phrase (306), (e.g., control inputs), to the respective delay chains. In some embodiments, the pseudo-random function 302 is a linear feedback shift register (LFSR).

Figure 10:
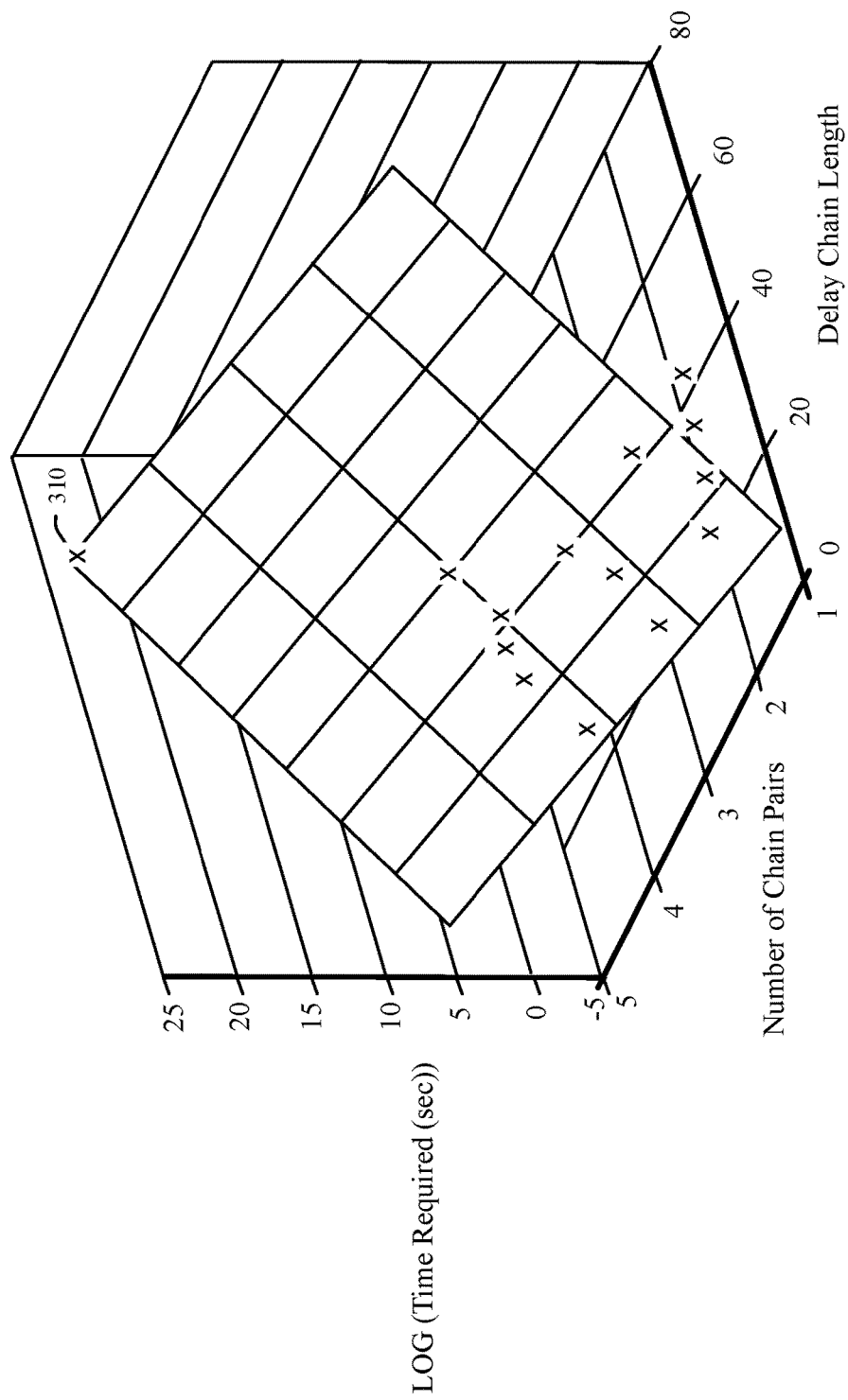
FIG. 10 is a graphic view showing the time required to perform a Machine Learning attack on a PUF system for a different number of chains and chain lengths.

FIG. 10 illustrates the effectiveness of the component authentication against machine learning attacks using the multi-level arbiter and the non-linear combiner based on the Signed MAX operator, for a variety of chain lengths and number of chains. Specifically, for the data point 310 using five arbiters, each with two delay chains of 64 stages, one type of machine learning attack would require 160,820 days to model a single device. In other embodiments, using other ML attacks, the component authentication is completely immune to the ML attacks.

Figure 11:
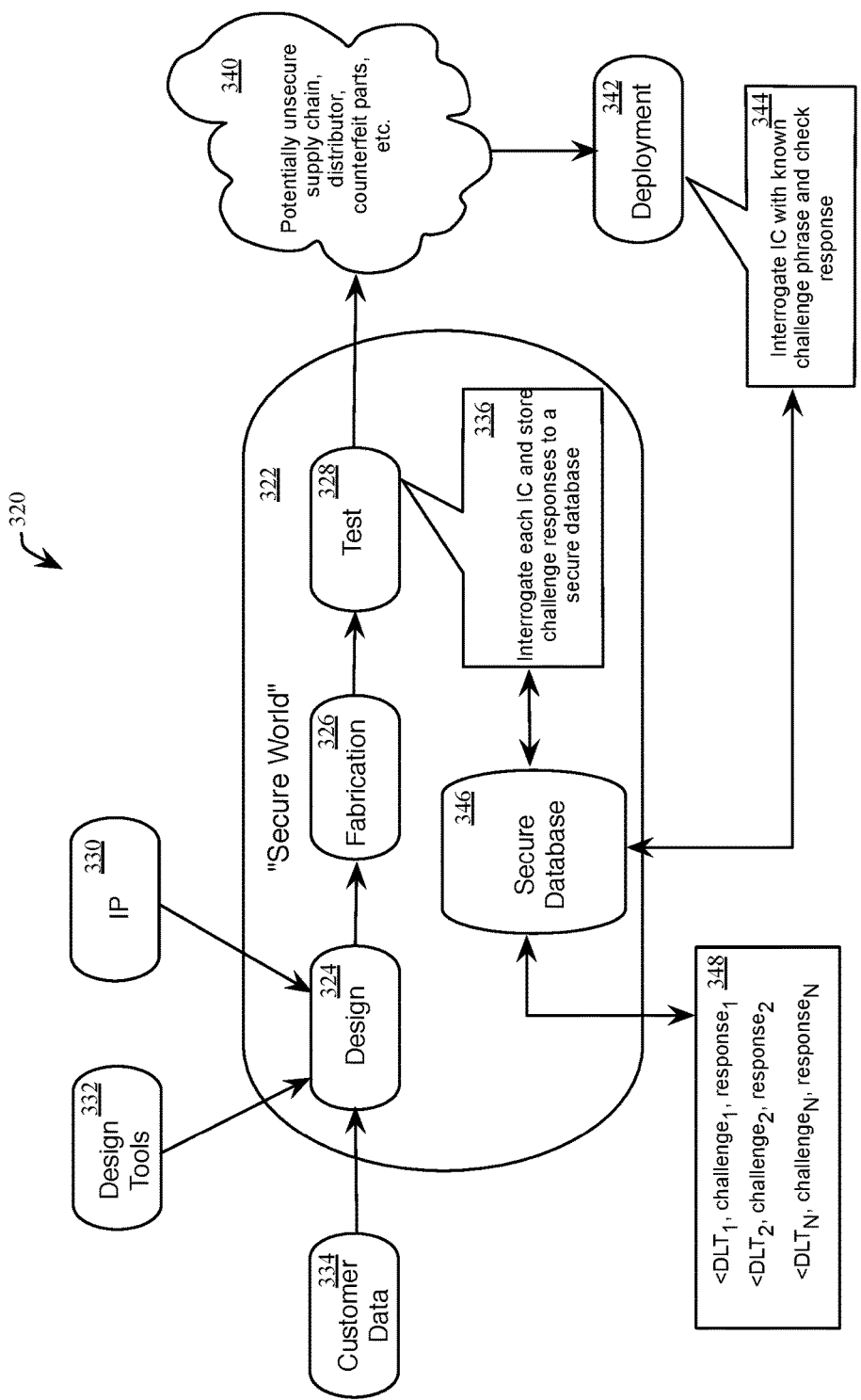
FIG. 11 is functional block diagram of a system for part authentication utilizing a multi-level arbiter, in accordance with an embodiment of the present disclosure.

FIG. 11 shows a system 320 for manufacturing, testing, deploying and verifying the authenticity of a component using the authentication methods and apparatus described herein. Specifically, during test, N responses would be recorded for N respective challenges presented to each device. In one embodiment, this step is performed at wafer-sort. The Challenge-Response-Pairs (CRPs) would be stored in a secure database. The customer would poll a part in the field with a given challenge phrase and the component manufacturer would then validate the customer's measured responses against those stored in the secure database.

A representative system 320 includes a "Secure World" 322 environment including an environment for design 324, fabrication 326 and test 328 of a component. A Secure World includes measures to protect the integrity and security of data used therein and is not limited by a single physical facility. The design environment 324 communicates with sources of Intellectual Property (IP) 330, design tools 332 and customer data 334. The test environment 328 includes a method 336 for interrogating each IC, (e.g., semiconductor component), and storing responses to a challenge input or control input in a secure database 346. Subsequent to design, fabrication and test of the component, the component is introduced into a potentially unsecure supply chain 340 where the potential for counterfeiting can occur. In various embodiments, the components are shipped from a distributor or supply chain 340 to a deployment point or user 342. The deployment point 342 includes without limit, the end user and retail outlets. A method 344 for interrogating the component with a secure CRP 348 occurs at the deployment point 342 using data stored in the secure database 346.

Figure 12:
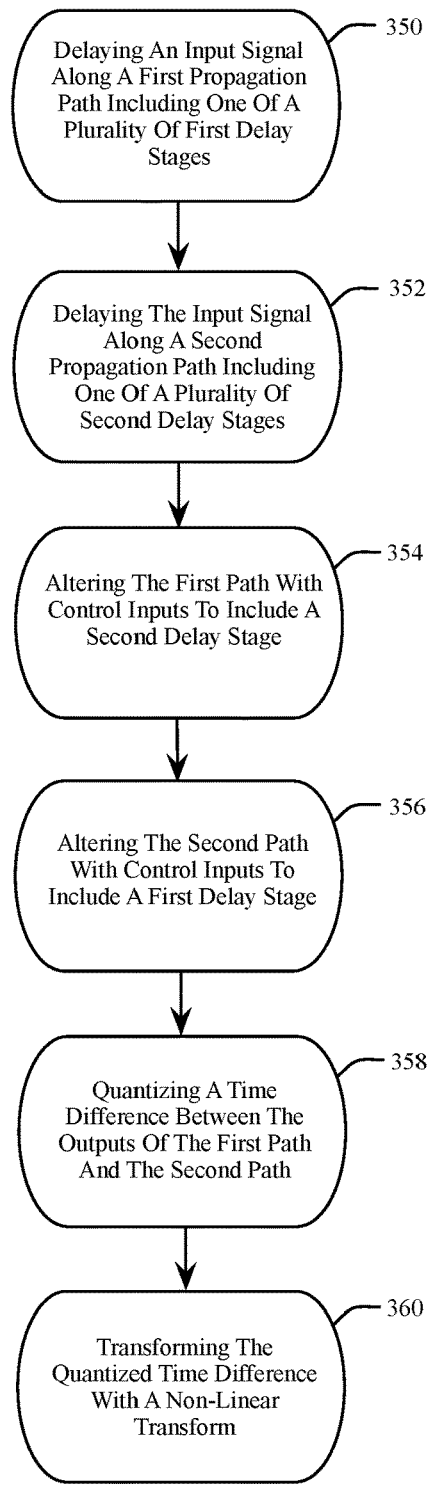
FIG. 12 is a flowchart representation of a method for component authentication in accordance with an embodiment of the present disclosure.

FIG. 12 illustrates a method for component authentication. At 350, an input signal is delayed along a first propagation path including one of a plurality of first delay stages. At 352, the input signal is delayed along a second propagation path including one of a plurality of second delay stages. At 354, the first path is altered with control inputs to include a second delay stage. At 356, the second path is altered with the control inputs to include a first delay stage. At 358, a time difference between the outputs of the first path and the second path is quantized. At 360, the quantized time difference is quantized with a non-linear transform.

As will be appreciated, embodiments as disclosed include at least the following. In one embodiment, an apparatus for component authentication comprises a first delay chain including a plurality of first delay stages connected in series. A second delay chain including a plurality of second delay stages is connected in series, wherein the first delay chain has a same number of delay stages as the second delay chain. An input signal is configured to propagate along a first propagation path including at least one of the first delay stages and to propagate along a second propagation path including at least one of the second delay stages. The apparatus further comprises a plurality of control inputs. Each control input is configured to alter the first propagation path to include a respective second delay stage, and the second propagation path to include a respective first delay stage. Each control input controls a respective first delay stage and a respective second delay stage. An arbiter is configured to quantize a time difference between a first output of the first delay chain and a second output of the second delay chain into a plurality of time bins represented by a multi-bit output. A combiner is configured to provide a response output based on a non-linear transformation of the multi-bit output.

Alternative embodiments of the apparatus for component authentication include one of the following features, or any combination thereof. The arbiter includes a plurality of comparators, each comparator configured to compare the first output to the second output to determine a respective time difference therebetween, each comparator including a respective time delay, wherein the multi-bit output has a uniform probability density function. Each time bin is represented by one of a pair of adjacent multi-bit outputs, a single multi-bit output having a minimum value, and a single multi-bit output having a maximum value. The non-linear transform is a Signed MAX probability density function configured to reduce a probability of the plurality of time bins occurring at a mean of the Signed MAX probability density function. Each delay stage is a multiplexer controlled by a respective control input to select one of an output of a delay stage from the first delay chain and an output of a delay stage from the second delay chain. A plurality of outputs of a linear feedback shift register (LFSR) is connected to the respective control inputs, the LFSR configured to randomize the control inputs. The combiner is configured to provide a response output based on a non-linear transformation of a plurality of multi-bit outputs, each of the multi-bit outputs received from a respective arbiter connected to a respective first delay chain and a respective second delay chain. The plurality of multi-bit outputs includes at least five multi-bit outputs. At least one of the arbiter and the combiner includes differential circuitry configured to reduce a variation of radiated power. Each of the delay stages are geometrically matched to each other. The input signal includes a high slew rate transition.

In another embodiment, a method for component authentication comprises delaying an input signal along a first propagation path including at least one of a plurality of first delay stages connected in series. The input signal is delayed along a second propagation path including at least one of a plurality of second delay stages connected in series, wherein the first delay stages have a same number of delay stages as the second delay stages. Altering with a plurality of control inputs includes altering the first propagation path to include at least one of the second delay stages, and the second propagation path to include at least one of the first delay stages, each control input controlling a respective first delay stage and a respective second delay stage. A time difference between a first output of the first propagation path and a second output of the second propagation path is quantized into a plurality of time bins represented by a multi-bit output. The multi-bit output is transformed with a non-linear transform to provide a response output.

Alternative embodiments of the method for component authentication include one of the following features, or any combination thereof. Each of the time bins are delayed with a respective time delay, wherein the multi-bit output has a uniform probability density function. Transforming with the non-linear transform includes transforming with a Signed MAX probability density function to reduce a probability of the plurality of time bins occurring at a mean of the Signed MAX probability density function. A plurality of multi-bit outputs is transformed with the non-linear transform to provide the response output, each of the multi-bit outputs received from a respective arbiter connected to a respective first delay chain and a respective second delay chain. The plurality of control inputs is generated with a linear feedback shift register. The plurality of control inputs is generated with a pseudo-random function generator.

In another embodiment, an apparatus for component authentication comprises an input signal configured to propagate along a first propagation path including at least one of a plurality of first multiplexers connected in series, and to propagate along a second propagation path including at least one of a plurality of second multiplexers connected in series. The apparatus comprises a plurality of control inputs. Each control input selects one of two inputs of a respective first multiplexer and one of two inputs of a respective second multiplexer to alter the first propagation path to include the respective second multiplexer, and to alter the second propagation path to include the respective first multiplexer. An arbiter is configured to quantize a time difference between a first output of the first propagation path and a second output of the second propagation path into a plurality of time bins represented by a multi-bit output, each of the time bins including a respective time delay, wherein the multi-bit output has a uniform probability density function. A combiner is configured to provide a response output from a transformation with a Signed MAX probability function of the multi-bit output, wherein a probability of the plurality of time bins is reduced at a mean of the Signed MAX probability density function.

Alternative embodiments of the apparatus for component authentication include one of the following features, or any combination thereof. A plurality of outputs of a linear feedback shift register (LFSR) is connected to the respective control inputs, the LFSR configured to randomize the control inputs. The combiner provides a response to the transformation of at least five multi-bit outputs, each of the multi-bit outputs representing a time difference between a respective first propagation path and a respective second propagation path.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:
1. An apparatus for component authentication comprising:
   a first delay chain including a plurality of first delay stages connected in series;
   a second delay chain including a plurality of second delay stages connected in series, wherein the first delay chain has a same number of delay stages as the second delay chain;

an input signal configured to propagate along a first propagation path including at least one of the first delay stages and to propagate along a second propagation path including at least one of the second delay stages;

a plurality of control inputs, each control input configured to alter the first propagation path to include a respective second delay stage, and the second propagation path to include a respective first delay stage, each control input controlling a respective first delay stage and a respective second delay stage;

an arbiter configured to quantize a time difference between a first output of the first delay chain and a second output of the second delay chain into a plurality of time bins represented by a multi-bit output for each control input; and a combiner configured to provide a response output based on a non-linear transformation of the multi-bit output.

2. The apparatus of claim 1 wherein the arbiter includes a plurality of comparators, each comparator configured to compare the first output to the second output to determine a respective time difference therebetween, each comparator including a respective time delay, wherein the multi-bit output has a uniform probability density function.

3. The apparatus of claim 1 wherein each time bin is represented by one of a pair of adjacent multi-bit outputs, a single multi-bit output having a minimum value, and a single multi-bit output having a maximum value.

4. The apparatus of claim 1 wherein the non-linear transform is a Signed MAX probability density function configured to reduce a probability of the plurality of time bins occurring at a mean of the Signed MAX probability density function.

5. The apparatus of claim 1 wherein each delay stage is a multiplexer controlled by a respective control input to select one of an output of a delay stage from the first delay chain and an output of a delay stage from the second delay chain.

6. The apparatus of claim 1 further comprising a plurality of outputs of a linear feedback shift register (LFSR) connected to the respective control inputs, the LFSR configured to randomize the control inputs.

7. The apparatus of claim 1 wherein the combiner is configured to provide a response output based on a non-linear transformation of a plurality of multi-bit outputs, each of the multi-bit outputs received from a respective arbiter connected to a respective first delay chain and a respective second delay chain.

8. The apparatus of claim 7 wherein the plurality of multi-bit outputs includes at least five multi-bit outputs.

9. The apparatus of claim 1 wherein at least one of the arbiter and the combiner includes differential circuitry configured to reduce a variation of radiated power.

10. The apparatus of claim 1 wherein each of the delay stages are geometrically matched to each other.

11. The apparatus of claim 1 wherein the input signal includes a high slew rate transition.

12. A method for component authentication comprising:

delaying an input signal along a first propagation path including at least one of a plurality of first delay stages connected in series;

delaying the input signal along a second propagation path including at least one of a plurality of second delay stages connected in series, wherein the first delay stages have a same number of delay stages as the second delay stages;

altering with a plurality of control inputs, the first propagation path to include at least one of the second delay stages, and the second propagation path to include at least one of the first delay stages, each control input controlling a respective first delay stage and a respective second delay stage;

quantizing a time difference between a first output of the first propagation path and a second output of the second propagation path into a plurality of time bins represented by a multi-bit output for each control input; and transforming the multi-bit output with a non-linear transform to provide a response output.

13. The method of claim 12 further comprising delaying each of the time bins with a respective time delay, wherein the multi-bit output has a uniform probability density function.

14. The method of claim 12 wherein transforming with the non-linear transform includes transforming with a Signed MAX probability density function to reduce a probability of the plurality of time bins occurring at a mean of the Signed MAX probability density function.

15. The method of claim 12 further comprising transforming a plurality of multi-bit outputs with the non-linear transform to provide the response output, each of the multi-bit outputs received from a respective arbiter connected to a respective first delay chain and a respective second delay chain.

16. The method of claim 12 further comprising generating the plurality of control inputs with a linear feedback shift register.

17. The method of claim 12 further comprising generating the plurality of control inputs with a pseudo-random function generator.

18. An apparatus for component authentication comprising:

an input signal configured to propagate along a first propagation path including at least one of a plurality of first multiplexers connected in series, and to propagate along a second propagation path including at least one of a plurality of second multiplexers connected in series;

a plurality of control inputs, each control input selecting one of two inputs of a respective first multiplexer and one of two inputs of a respective second multiplexer to alter the first propagation path to include the respective second multiplexer, and to alter the second propagation path to include the respective first multiplexer;

an arbiter configured to quantize a time difference between a first output of the first propagation path and a second output of the second propagation path into a plurality of time bins represented by a multi-bit output for each control input, each of the time bins including a respective time delay, wherein the multi-bit output has a uniform probability density function; and a combiner configured to provide a response output from a transformation with a Signed MAX probability function of the multi-bit output, wherein a probability of the plurality of time bins is reduced at a mean of the Signed MAX probability density function.

19. The apparatus of claim 18 further comprising a plurality of outputs of a linear feedback shift register (LFSR) connected to the respective control inputs, the LFSR configured to randomize the control inputs.

20. The apparatus of claim 18 wherein the combiner provides a response to the transformation of at least five multi-bit outputs, each of the multi-bit outputs representing a time difference between a respective first propagation path and a respective second propagation path.

* * * * *